Z. T. BLACKWELL.
CORN-SHELLER.
No. 186,075. Patented Jan. 9, 1877.
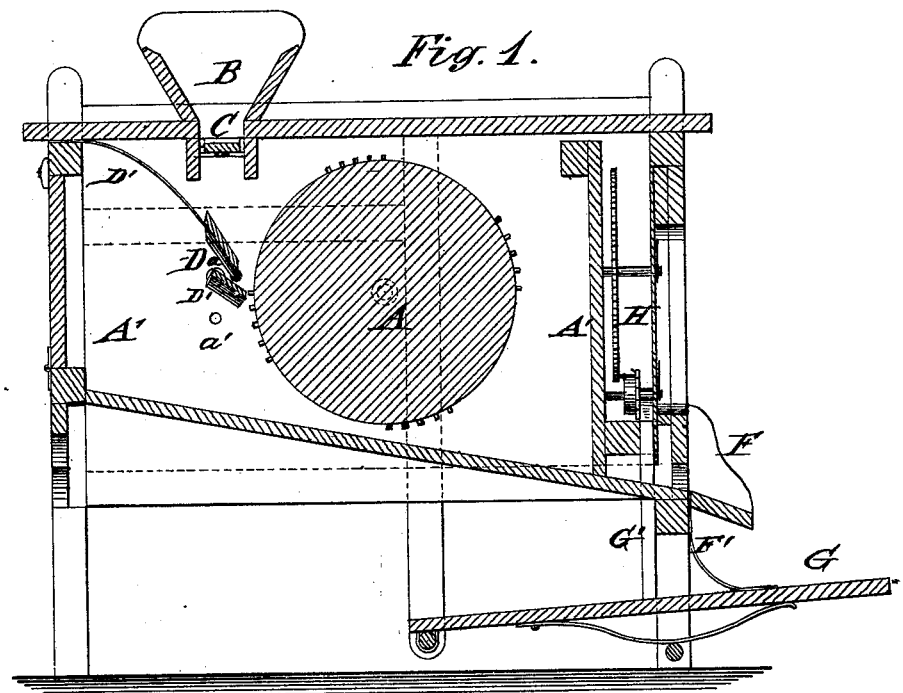
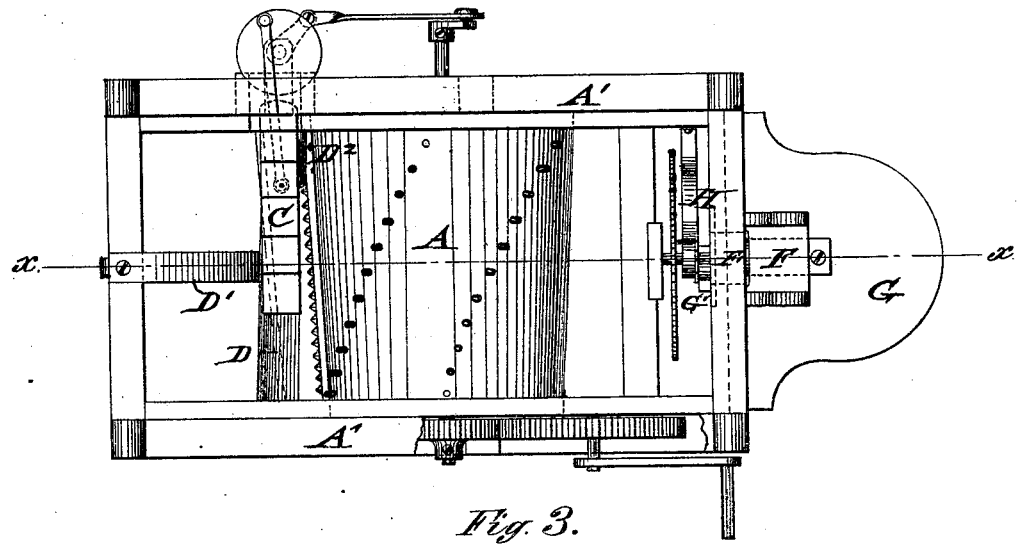
WITNESSES:
H. Rydquist
John Goethals
INVENTOR:
Z. T. Blackwell
BY
ATTORNEYS.
N. PETERS, PHOTO-LITHOGRAPHER, WASHINGTON, D.C.

UNITED STATES PATENT OFFICE.

ZADOK T. BLACKWELL, OF CARRINGTON, MISSOURI.

IMPROVEMENT IN CORN-SHELLERS.

Specification forming part of Letters Patent No. 186,075, dated January 9, 1877; application filed August 7, 1876.

*To all whom it may concern:*

Be it known that I, ZADOK THOMAS BLACKWELL, of Carrington, in the county of Callaway and State of Missouri, have invented a new and Improved Corn-Sheller, of which the following is a specification:

In the accompanying drawing, Figure 1 represents a vertical longitudinal section on the line $x\ x$, Fig. 2, of my improved corn-sheller; Fig. 2, a plan view of the same; and Fig. 3, a detail view, showing ear-pressing pieces and exit-hole for cobs.

Similar letters of reference indicate corresponding parts.

My invention relates to a corn-sheller of improved construction, in which the corn is rapidly separated from the cob and the cob expelled.

The invention consists of a toothed revolving cylinder of slightly-tapering shape, to which the ears of corn are fed from a hopper by a reciprocating slide with step-shaped surface. The ears drop on spring-acted pressing-pieces, that carry the same along the clearing-teeth, and, finally, by means of a roller of the spring-piece, through an exit-aperture of the sheller-frame, to the outside. A small outside hopper, with opening near the lower end, conducts any corn that may pass out with the cob back into the sheller.

In the drawing, A represents a revolving cylinder, with spirally-set teeth arranged thereon. The cylinder is revolved by a hand-crank and gear-wheels, or other power, in a casing, A', with inclined bottom and a top hopper, B. The cylinder is made slightly tapering from one side to the other, so as to form, more strictly speaking, a frustum of a cone, along which the ears are conducted for being shelled. The ears are fed through the hopper B, and arranged to be dropped in regular and straight order by a reciprocating slide, C, with steps or teeth, that serve to conduct one ear at the time to the end aperture. The slide C is operated by a revolving crank-disk and crank-rods, in connection with the shelling-cylinder A, as shown in Fig. 2. The ear is dropped from the hopper on inclined pressing-pieces D, with grated surfaces, that are forced by bearing steel springs $D^1$, of suitable power, against the cylinder. The ear is first thrown in contact with the narrower end of cylinder, which begins the work of shelling, and passes then on to the middle part of the cylinder, and, finally, to the largest opposite part of the same, the corn being shelled in easy manner during its passage along the toothed cylinder. At the end of the upper spring-piece D is arranged a small roller, $D^2$, that greatly facilitates the cob in turning, so that the same may be ejected through an aperture, $d$, of the side wall of the casing or box A' to the outside. A small hopper, E, with guide-partitions, inclined at the upper part, retains all the corn that may pass out of the sheller, and conducts it back to the same through an aperture, $a'$, at the bottom of the same, below the exit-aperture $a$. The inclination of the presser-pieces, in connection with the shape of the cylinder, produces the rapid and easy passage of the ears through the machine and the ejection of the cobs. The regular shelling of the corn is kept up by the feeder at the bottom of hopper, which drops one ear of corn at a time. The hopper may be further arranged with a perpendicular regulator, that works in slides of hopper and has stays, so as to admit any sized ear.

I am aware that hoppers, spring-pressers, and tapering sheller-cylinders have been before combined; but mine feeds the ears, one by one, at the small end of sheller, so that the cylinder enlarges as the cob in its progress becomes stripped of its corn.

What I claim is—

The combination of hopper B, having the stepped movable slide, the tapering cylinder, having oblique rows of teeth, and the spring-presser $D\ D^1$, all arranged to operate as and for the purpose specified.

ZADOK THOMAS BLACKWELL.

Witnesses:
 H. S. TURNER,
 M. E. GILBERT.